(12) United States Patent
Wile

(10) Patent No.: US 6,327,559 B1
(45) Date of Patent: Dec. 4, 2001

(54) METHOD FOR CREATING A SIMULATION ENVIRONMENT FOR ENHANCED LOGIC VERIFICATION OF A BRANCH HISTORY TABLE

(75) Inventor: Bruce Wile, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,890

(22) Filed: May 4, 1999

(51) Int. Cl.[7] .................................................. G06F 17/50
(52) U.S. Cl. ........................ 703/22; 703/15; 712/240
(58) Field of Search ....................... 703/15, 22; 712/240

(56) References Cited

U.S. PATENT DOCUMENTS

| | | | |
|---|---|---|---|
| 5,515,527 | * 5/1996 | Kurashita | 703/15 |
| 5,673,425 | * 9/1997 | Iwashita | 712/227 |
| 5,995,915 | * 11/1999 | Reed et al. | 702/119 |
| 6,006,028 | * 12/1999 | Aharon et al. | 703/21 |
| 6,011,830 | * 1/2000 | Sasiu et al. | 379/1 |

* cited by examiner

Primary Examiner—Kenneth S. Kim
(74) Attorney, Agent, or Firm—Lynn L. Augspurger

(57) ABSTRACT

Disclosed is a method for creating a verification environment to drive a Branch History Table. It consists of two components. First, a method for creating instruction streams for controlling the stress on branch history table logic. The second is a method for pre-loading the branch history array to allow for interesting simulations at the beginning of the test.

19 Claims, 1 Drawing Sheet

METHOD FOR CREATING A SIMULATION ENVIRONMENT FOR ENHANCED LOGIC VERIFICATION OF A BRANCH HISTORY TABLE

FIELD OF THE INVENTION

In general this invention relates to testing of electrical components and, particularly, to testing and verification of a design for microprocessor logic, and provides a method for creating a simulation environment for enhanced logic verification of a Branch History Table (BHT).

TRADEMARKS

S/390 and IBM are registered trademarks of International Business Machines Corporation, Armonk, New York, U.S.A. Other names may be registered trademarks or product names of International Business Machines Corporation or other companies.

BACKGROUND

Within IBM for S/390 development testing by running a program test, a kind of processor level testing can be used to verify architectural compliance of the Branch History Table or BHT, but such testing, before this invention, will not necessarily catch problems where the BHT logic fails to perform as intended. There are no known patents which deal with the verification of a branch history table, so those in the art have been previously left without any teaching. Accordingly, I have described herein a new method for verification of the Branch History Table described herein and believe its use will be desirable.

SUMMARY OF THE INVENTION

This invention describes a method for verification of instruction processing units such as a Branch History Table (BHT) of a machine design. The verification method, according to the preferred embodiment described to drive a Branch History Table, comprises two components. A first component comprises the steps of a method for creating instruction streams for controlling the stress on branch history table logic. The second component comprises a method for pre-loading the branch history array to allow for interesting simulations at the beginning of the test.

The method for creating instruction streams allows user control over the parameters that are of interest to the branch history logic, such as the rate of branches in the instruction stream and the branch type. By varying these parameters in different tests, the user can stress different corners of the logic and easily manipulate the test environment.

The method for pre-loading the branch history array gives varying control over the initial state of the branch history table as the test begins. This method allows the test to have a "history" at the beginning of the simulation that otherwise would take many simulation cycles to develop. This method gives user control over interesting simulation scenarios at the onset of the testing.

These methods can be combined and varied, by the steps described, to provide useful testing of the BHT environment and the design that is being verified by the method described to provide architectural compliance for a machine design. This is particularly effective for the corner conditions of the designed logic.

DETAILED DESCRIPTION OF THE INVENTION

Observation showed that architectural results of a test where a branch is initially guessed wrong are the same as the results of the same test where the branch is guessed correctly. The guessed wrong test just takes longer to execute because the processor pipeline has to recover from decoding the wrong instruction path. The new methods include specialized generation of instruction streams for simulations and innovative pre-loading of the Branch History Table array. Together, the methods described herein are designed to cover the corner conditions of the logic.

Figure 1:
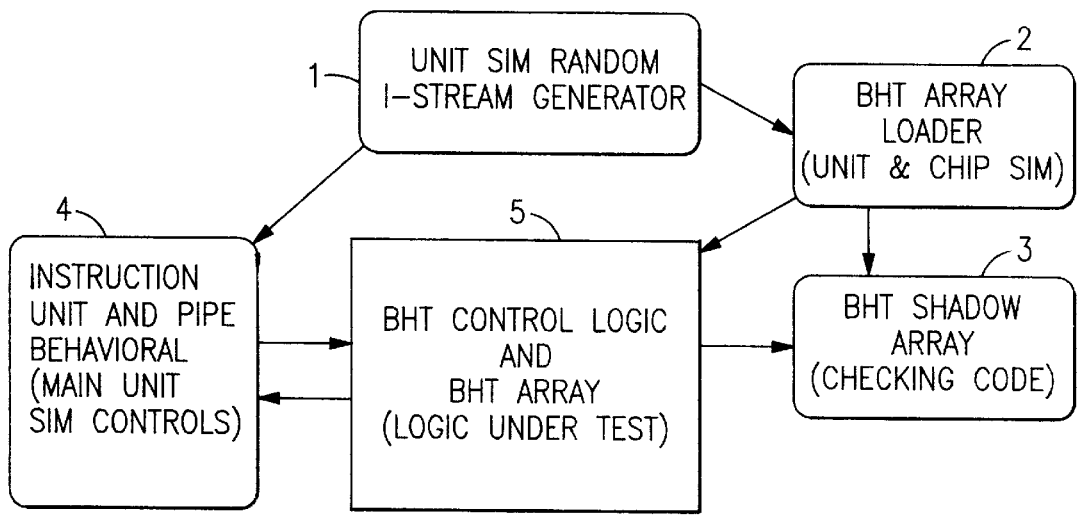
FIG. 1 illustrates the BHT simulation environment.
Figure 2:
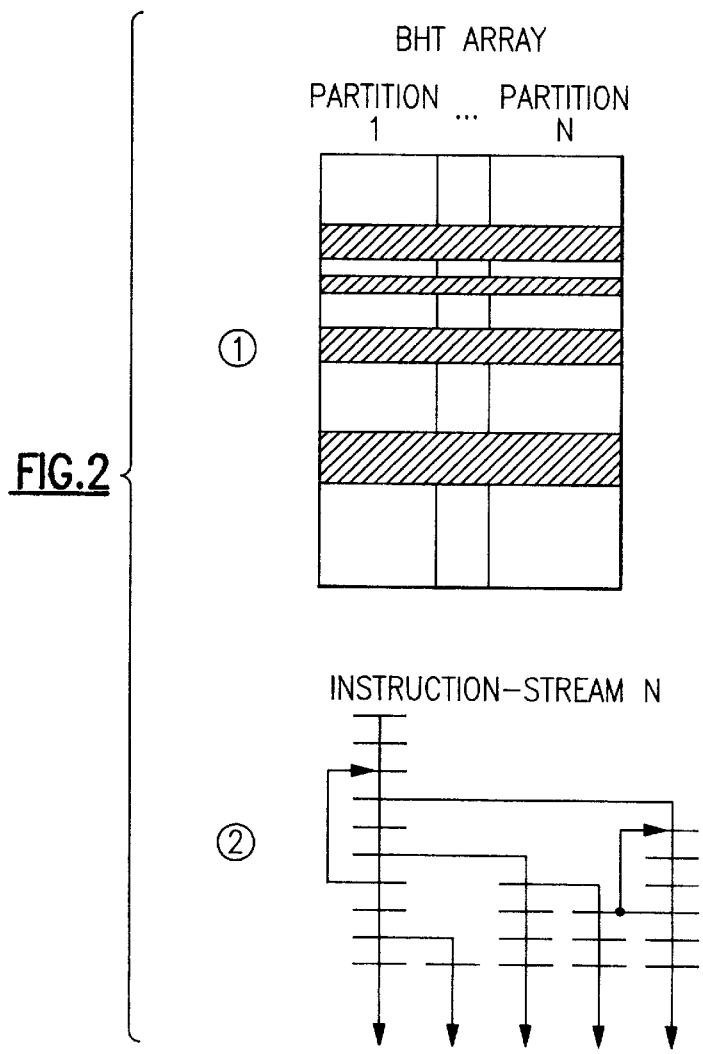
FIG. 2 illustrates the two-step algorithm used to create the instruction streams.

Turning now in more detail to the problem, refer to FIG. 1 which generally illustrates the BHT simulation environment in which the methods illustrated by FIG. 2 are implemented. The Unit Simulation Random Instruction stream generator (1) and the BHT Array Loader (2) are new, while the behavioral (4) and Shadow array (3) combine the Random Instruction stream generator (1) and BHT Array Loader (2) with use of other verification methods. The BHT Control Logic (5) represents the design that is being verified.

Here, the reader should recognize that the Unit Simulation Random Instruction stream generator (1) and the BHT Array Loader (2) provide a new method for creating instruction streams that allows user control over the parameters that are of interest to the branch history logic, such as the rate of branches in the instruction stream and the branch type. By varying these parameters in different tests, the user can stress different corners of the logic and easily manipulate the test environment.

It should be recognized that others have used a general simulation methodology to verify a block of logic (FIG. 1, label 5) with a behavioral driver (FIG. 1, label 4) and shadow logic used for checking results (FIG. 1, label 3). In the case of BHT logic, the behavioral driver is commonly architectural verification programs. The preferred embodiment instead provides a new method for simulating the BHT logic, using data streams that mimic instructions streams, but do not contain specific instructions. The replacement of real instructions with "psuedo-instruction data streams" is possible because the BHT logic is only privy to instruction addresses and the type of instruction, but not the actual instruction itself. Therefore, the behavioral stimulus only supplies the logic with the limited data that the logic needs to operate.

Now, turning to FIG. 2, it will be recognized that this method provides a way to verify a Branch History Table. There needs to be "history" to record. A randomized data stream which is often used for testing is not used here as it does not test the logic appropriately. Instead, a stream is created that has full control over the simulations, yet supplies the logic with interesting scenarios that verify the compliance of the logic to the design specifications.

Thus, the steps which will be described provide a method for pre-loading the branch history array which gives varying control over the initial state of the branch history table as the test begins. This method allows the test to have a "history" at the beginning of the simulation that otherwise would take many simulation cycles to develop. This method gives user control over interesting simulation scenarios at the onset of the testing.

More specifically, referring to FIG. 2, a two-step algorithm is used to create the instruction streams. Step 1 (1) is the creation of a limited number of blocks to be used during the test, and Step 2 is the creation of the stream within those blocks. A typical Instruction stream has a flow as pictured in (2).

The method employs an algorithm that starts by a step creating a set of "psuedo-instruction data streams" that will be used throughout the test. By limiting the number of these instruction streams, an instruction history will be observed and recorded by the BHT during the test.

The first step in creating the "pseudo-instruction data streams" is to limit the range of the BHT array that will be exercised during the test (FIG. 2, labeled on drawing with 1). By limiting the range, fewer cycles of simulation are needed to create interesting conflicts within the BHT logic. These conflicts occur as the BHT logic attempts to record a history for multiple branch instructions that are mapped to limited array areas. One or more portions of the BHT array are randomly selected in this process. Each portion of the BHT array space may hold multiple branch histories. The characteristics of the simulation can be altered by using random biasing to choose the number of portions and size of each portion of the array. Fewer portions or smaller sizes will increase the likelihood of history conflicts. More portions or larger sizes will decrease the likelihood of conflicts. Fewer conflicts generally cause the BHT to perform better.

After the usable array area has been selected, the process is ready to create the "pseudo-instruction data streams." The outcome of this step is one or more data streams as pictured in FIG. 2, labeled in that drawing with 2. During the simulation, which follows the pseudo instruction stream generation, the behavioral will choose from these streams to stimulate the BHT logic. As one stream ends, the behavioral can choose a different stream to continue the simulation.

The steps for creating the "pseudo-instruction data streams" begin by choosing how many streams to create and how many instructions each stream will contain. Once again, the biasing to choose these parameters will effect the simulations. More streams or longer streams will decrease the likelihood that the BHT array has a particular branch's history.

Once the number of instruction streams and the lengths are determined, the actual pseudo instruction data is generated for each stream. In this step, instruction addresses and instruction types are created. All of the instruction addresses that are created will map to the portions of the BHT array that were determined in the array area step above.

The instruction type information details whether or not this instruction is a branch, and if so, the class of branch is determined. The actual instruction opcode is not required by the BHT and, therefore, is not created. Whether or not an instruction is a branch is once again determined by biasing. If an instruction is determined to be a branch, then a target address is generated, once again limited by the array area determined above. The target instruction address can either be an address previously generated (simulating an instruction stream loop) or a new address. A new address will cause the generator to recursively create the new "pseudo instruction stream" before returning to finish the current stream.

The last instruction in each pseudo instruction stream is always a branch to a restricted address area. During the simulation, the target of this branch is manipulated to point to the beginning of another instruction stream.

In accordance with the preferred embodiment, when all pseudo instruction streams are created, the BHT array can be preloaded for the simulation. This is an important and second component of this invention. If the BHT array is not preloaded, the beginning portions of the simulation are wasted as a branch history is accumulated from the pseudo instruction streams as the simulation occurs. By preloading the array with various degrees of "correct" branch history data, the initial portion of the simulation becomes highly effective. Variances in the correctness of the preloaded data will stress the logic in different ways. The process provides variables in preloading the array. These are:

(a) manipulation of the correct branch target address, and (b) creating a history in the array for instruction addresses that are not branches, and (c) changing the class of branch for a particular instruction address, and (d) loading random data into the array (akin to not creating a history, except that the valid bits within the array are 'on'), and (e) choosing to not preload all branch instruction addresses.

Each of these variables provides choices that will cause the simulation to proceed differently. For example, if the target address is manipulated before being stored in the array, the BHT logic will mispredict the target address, causing the processor pipeline to stall. This is very desirable in the simulation test provided here, and it causes corner conditions in the logic to be exercised.

Some or all of these variables can be used to preload the array. Biasing controls are used to choose these modes. Each of the instruction streams are scanned for branches, one at a time. When a branch is encountered, the biasing is used to load that branch into the array. This is only done if there is room in the array for the branch. If many branches are mapped to a single congruence class, only the first N can be loaded, where N is the number of congruence classes. Once the compartment is filled, no further branches will be preloaded into that compartment. The array preload continues until all branches in the pseudo instruction stream have been scanned.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for use in a simulation test for creating test results for verification of instruction processing units such as a branch history table, comprising the steps of:

creating a first test instruction stream by activating a unit simulation instruction stream generator (1) to provide at least one or more first test instruction streams as a data stream that mimics instructions streams with a psuedo-instruction stream that has full control over the simulations and which supplies the logic of the instruction processing units being tested with such limited data that supplies the behavioral simulus that said logic needs to operate for the test but does not contain specific instructions to the instruction processing unit block of logic under test (5) via an instruction unit pipeline simulation control unit array loader (4), and coupling the test instruction stream with said psuedo-instruction stream that has full control over the simulations for said the block logic under test from said instruction processing unit block of logic under test (5) as results to a shadow array (3) to provide test signal outputs for checking results in said shadow array whereupon shadow logic (3) is used for checking said results.

2. A method according to claim 1 further comprising, pre-loading a branch history array whereby a second instruction stream is loaded into said logic under test with an array loader (3) for verification.

3. A method according to claim 1 wherein, said unit simulation instruction stream generator creates a set of "psuedo-instruction data streams" that will be used throughout the test, with a limited number of these first test instruction streams, and wherein an instruction history is recorded by a branch history table (BHT) array during the test.

4. A method according to claim 3 wherein, the first step in creating the "psuedo-instruction data streams" is to limit the range of the BHT array that will be exercised during the test to use fewer cycles of simulation to create interesting conflicts within the BHT array logic which occur as the BHT logic attempts to record a history for multiple branch instructions that are mapped to limited array areas, and wherein one or more useable array areas of the BHT array are selected in this process such that each portion of the BHT array space may hold multiple branch histories.

5. A method according to claim 4 wherein, after the usable array area has been selected, the process creates the one or more "psuedo-instruction data streams" which are passed to said instruction unit pipeline simulation control unit array loader (4) which will chose from these streams to stimulate the BHT logic.

6. A method according to claim 5 wherein, as one stream ends, the instruction unit pipeline simulation control unit array loader (4) can chose a different stream to continue the simulation.

7. A method according to claim 3 wherein, creating a first test instruction stream by activating a unit simulation instruction stream generator (1) to provide at least one or more first test instruction streams as a data stream that mimics instructions streams but to does not contain specific instructions to the instruction processing unit block of logic under test (5) generates actual pseudo instruction data for each first test instruction stream by creating instruction addresses and instruction types that will map to the area of the BHT array that were determined in the array area step of claim 3.

8. A method according to claim 7 wherein the instruction type information details whether or not the particular instruction is a branch, and if so, the class of branch is determined, and if an instruction is determined to be a branch, then a target address is generated, again limited by the determined array area determined, and the target instruction address can either be an address previously generated simulating an instruction stream loop or a new address which will cause the generator to recursively create the new "pseudo instruction stream" before returning to finish the current stream.

9. A method according to claim 2 wherein pre-loading the branch history array allows for differing simulations at the beginning of the test and the steps for creating instruction streams allows user control over the parameters that are of interest to the branch history logic.

10. A method according to claim 9 wherein the parameters which can be controlled by a user include the rate of branches in the instruction stream and the branch type.

11. A method according to claim 9 wherein by varying parameters controlled by the user in different tests the user can stress different corners of the logic and manipulate the test environment.

12. A method according to claim 2 in which pre-loading the branch history array gives varying control over the initial state of the branch history table as the test begins and provides a history at the beginning of the simulation.

13. A method according to claim 2 wherein preloading the array with various degrees of "correct" branch history data allowing the initial portion of the simulation to be used with different variances in the correctness of the preloaded data to stress said logic under test in different ways by providing variables in preloading the array.

14. A method according to claim 2 wherein preloading the array with a variable of "correct" branch history data allowing the initial portion of the simulation to be used with one or more of the following possible variables:

(a) manipulation of the correct branch target address, and (b) creating a history in the array for instruction addresses that are not branches, and (c) changing the class of branch for a particular instruction address, and (d) loading random data into the array (akin to not creating a history, except that the valid bits within the array are 'on'), and (e) choosing to not preload all branch instruction addresses.

15. A method according to claim 2 wherein preloading the array with a one or more of specific variables of "correct" branch history data allowing the initial portion of the simulation to be used with a selection from multiple variables of 'correct" branch history data which will cause the simulation to proceed differently.

16. A method according to claim 2 wherein preloading the array with a specific variable of "correct" branch history data allowing the initial portion of the simulation to be used with a manipulation of the correct branch target address selection from multiple variables of 'correct" branch history data which will cause the simulation to proceed differently, and when the target address is manipulated before being stored in the array, the BHT logic will mispredict the target address, causing the processor pipeline to stall during the simulation test provided here to causes corner conditions in the logic to be exercised.

17. A method according to claim 15 wherein some or all of these variables can be used to preload the array, and wherein biasing controls are used to choose these modes.

18. A method according to claim 17 wherein during simulation test each of the instruction streams are scanned for branches, one at a time, and when a branch is encountered, said biasing controls are used to load that branch into the array if there is room in the array for the branch.

19. A method according to claim 18 wherein if many branches are mapped to a single congruence class, only the first N can be loaded, where N is the number of congruence classes and once the compartment is filled, no further branches will be preloaded into that compartment whereby the array preload continues until all branches in the pseudo instruction stream have been scanned.

* * * * *